United States Patent [19]
Mooney et al.

[11] 3,902,745
[45] Sept. 2, 1975

[54] ELECTRICAL CONNECTOR

[75] Inventors: Thomas Mooney, Mt. Sinai; Richard A. Bauer, Mastic Beach, both of N.Y.

[73] Assignee: Electrical Fittings Corporation, East Farmingdale, N.Y.

[22] Filed: Jan. 2, 1974

[21] Appl. No.: 430,239

[52] U.S. Cl. .............................................. 285/247
[51] Int. Cl.² ........................................ F16L 33/22
[58] Field of Search ........................... 285/247–249, 285/251, 386, 387, 161, 175, 81, 82; 174/65 R, 78

[56] References Cited
UNITED STATES PATENTS

| | | | |
|---|---|---|---|
| 1,006,671 | 10/1911 | Myer | 285/247 |
| 1,266,416 | 5/1918 | Davis | 285/251 X |
| 3,281,869 | 11/1966 | Schweigaard-Olsen et al. | 285/161 X |
| 3,393,267 | 7/1968 | Busse | 174/78 |
| 3,549,177 | 12/1970 | Sotolongo | 285/175 |
| 3,647,934 | 3/1972 | Hurtt | 174/65 R |
| 3,659,880 | 5/1972 | Goldsobel | 285/161 |

*Primary Examiner*—Geo. V. Larkin
*Attorney, Agent, or Firm*—Howard C. Miskin

[57] ABSTRACT

A coupling for a flexible electrical conduit having a resilient yieldable protective sheath includes a tubular metal body member having at one end a threaded connector section and at the other end a conduit coupling sleeve provided with an external helical ridge have the same pitch as a helical groove in the conduit inside face. A collar having a tapered inside face threaded at a pitch less than that of the helical ridge is provided with an inner annular end wall having a groove mating and engaging the sleeve helical ridge. The collar tapered face engages the conduit outer face and the conduit is compressed between the confronting faces of the collar and sleeve.

10 Claims, 3 Drawing Figures

PATENTED SEP 2 1975

3,902,745

ELECTRICAL CONNECTOR

BACKGROUND OF THE INVENTION

The present invention relates generally to improvements in electrical conduit fittings and it relates more particularly to an improved self-sealing coupling for flexible electrical conduit of the type having an external liquid and gas proofing sheath of resilient or yieldable material on a helically wound flexible metallic core provided with an internal helical channel.

An electrical conduit which houses and protects current carrying cable from the ambient surroundings, such as liquids, vapors and gasses, and is in widespread use includes a helically wound tubular metal core in which successive convolutions are interlocked and which is covered by a yieldable, resilient or elastomeric sheath of polyvinyl chloride or the like. This type of cable is highly satisfactory, but possesses an important drawback in that it is difficult to effect an hermetic coupling therewith, such as to various types of electrical boxes such as junction, outlet and switch boxes. Many types of sealing types of couplings have been available and proposed for sheathed flexible conduit but these have many disadvantages. They are unreliable, complex and expensive, are inconvenient, time-consuming and difficult to apply, requiring the use of various tools, they are of little versatility and adaptability and otherwise leave much to be desired.

SUMMARY OF THE INVENTION

It is a principal object of the present invention to provide an improved conduit fitting.

Another object of the present invention is to provide an improved fitting for flexible electrical conduit.

Still another object of the present invention is to provide an improved self-sealing coupling for helically wound flexible electrical conduit of the type provided with a protective sheath of resilient yieldable material, which may be tightened by hand to provide the sealing characteristics.

A further object of the present invention is to provide an improved fitting of the above nature characterized by its reliability, ruggedness, low cost, ease and convenience of application and high versatility and adaptability.

The above and other objects of the present invention will become apparent from a reading of the following description taken in conjunction with the accompanying drawing which illustrates a preferred embodiment thereof.

In a sense the present invention contemplates the provision of a tubular fitting or coupling for a helically wound flexible conduit of the type having a resilient yieldable sheath and a helical groove on its inside face comprising a sleeve insertable into the conduit and having on its outer face a helical ridge with a pitch corresponding to that of the conduit helical groove and a collar coaxial with the sleeve and having an internal thread adapted to engage the conduit sheath and an inner annular end wall provided with a helical groove engaging the sleeve helical ridge. In its preferred form a threaded coupling is integrally coaxially formed with the sleeve and separated therefrom by a hexagonal tool accomodating section. The sleeve is longer than the collar and the inside face of the collar tapers inwardly. The collar thread has a lesser pitch or lead than that of the sleeve helical ridge.

The improved coupling is simple and rugged, consisting of only two parts, it is highly reliable in effecting a secure self-sealing attachment to the conduit, is easily and rapidly applied without the need for any tools, and is highly versatile and adaptable.

DESCRIPTION OF THE PREFERRED EMBODIMENT

Figure 1:
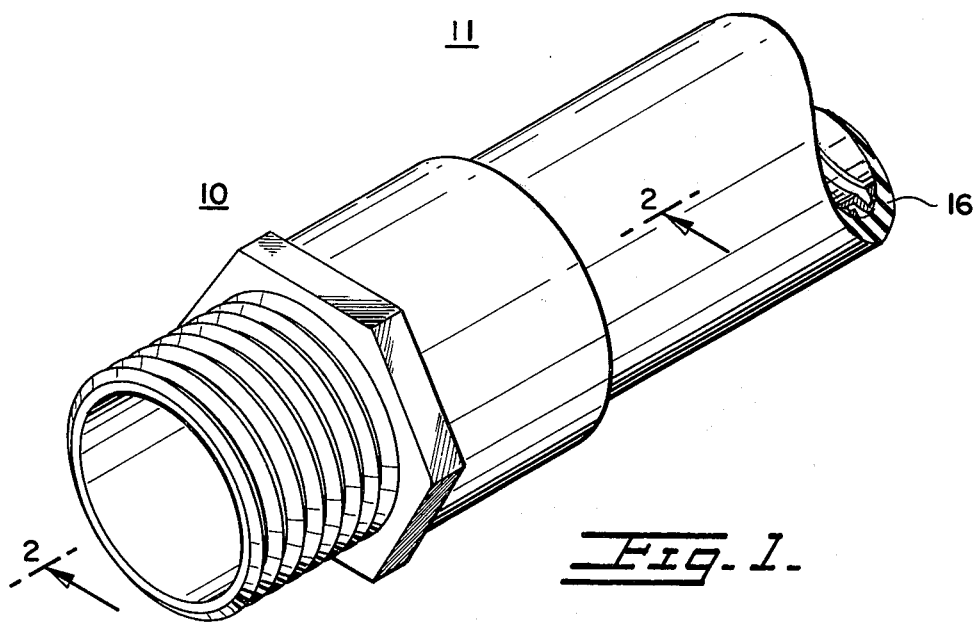
FIG. 1 is a perspective view of a fitting embodying the present invention illustrated applied to a sheathed flexible conduit.

Referring now to the drawing which illustrates a preferred embodiment of the present invention, the reference numeral 10 generally designates the improved coupling illustrated as applied to a resilient yieldable sheath cover flexible electrical flexible electrical conduit 11. The flexible conduit 11 is of the well known type having a tubular core formed of a spirally wound metallic strip 14 with walls of S-shaped transverse cross section, having interlocking partially overlapping convolutions. The convolutions are so related as to provide a helical groove 15 along the inside face of the conduit 11. A protective sheath 16 of resilient yieldable or deformable material, preferably an elastomeric material such as a synthetic elastomer or a resiliently deformable material, for example, polyvinyl chloride, covers the helical metallic core 14.

The fitting 10 comprises two cooperating components, a main tubular body member 12 and a sealing and locking collar 13. The body member 12 is formed of metal as an integral unit in any suitable manner and includes a sleeve 17 at its inner end, a coaxial externally threaded tubular coupling section 18 at its outer end and an intermediate wrench or other tool accomodating hex nut section 19 between sleeve 17 and coupling section 18.

The sleeve 17 has an outside diameter approximately equal to the inside diameter of conduit 11 and has formed on its outer peripheral surface a worm or helical ridge 20 having the same pitch and sense as that of the conduit inside helical groove 15, so that the sleeve 17 may be screwed into the conduit 11 by way of the mating groove and ridge 15 and 20. Immediately on the inside face of the nut section 19 are circumferentially spaced prismatic guide and locking projections 21. The coupling section 18 is shaped and dimensioned to screw engage the conventional internally threaded female coupling such as those found on electrical boxes.

The collar 13 is advantageously formed of a relatively rigid synthetic organic polymeric resin such as nylon, polypropylene or the like and includes a tubular cylindrical wall closed at its inner end by a thick annular wall 23 provided with an axial bore of a diameter about equal to that of the outside face of sleeve 17. Formed in the face of the bore in end wall 23 is a helical groove 24 which mates and engages the sleeve helical ridge 20 so that the turning of the collar 13 advances and retracts it along the sleeve 17.

The inside face of collar cylindrical wall 22 is advantageously inwardly tapered and is provided with a sharp thread 26 having a pitch or lead less than that of helical ridge 20, for example about one half of that of ridge 20 and the length of the sleeve 17 is about twice that of the threaded section of collar wall 22. The tapered annular space delineated by the confronting faces of collar wall 22 and sleeve 17 has a thickness or width at its open outer end about equal to the wall thickness of conduit 11 and it gradually diminishes to less than the conduit wall thickness, being considerably less than the conduit wall thickness at the inner end of the annular space. An annular channel 27 is formed in the outer end face of end wall 23 and registers with the projections 21.

Figure 2:
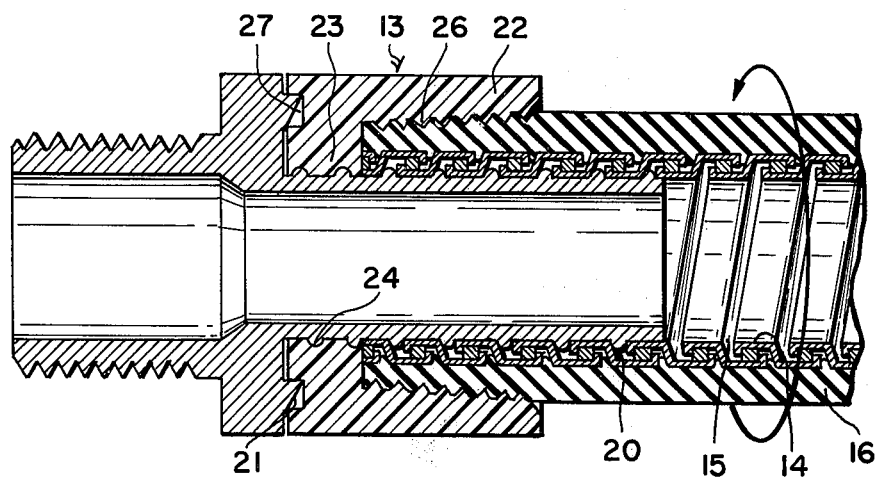
FIG. 2 is a sectional view taken along line 2—2 in FIG. 1.
Figure 3:
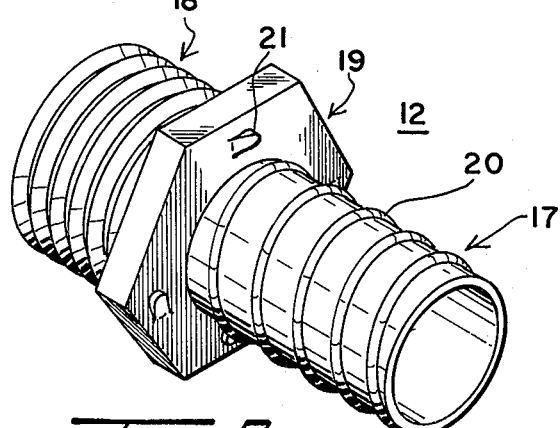
FIG. 3 is a perspective view of the body core member of the fitting.

Considering now the operation of the improved fitting in effecting the sealed mounting thereof to the conduit 11, the collar 13 is turned on sleeve 17 to substantially move it leftwardly to its fully retracted position, as shown in FIG. 2, with the sleeve 17 projecting axially beyond the collar 13. The sleeve 17 is then inserted and screwed into the conduit 11 until the sheath 16 on the leading end of the conduit 11 is engaged by the collar thread 26. The collar 13 is then turned so that the thread 26 bites into and advances along the sheath 16. With the advance of the collar 13 to the right as viewed in FIG. 2 along the conduit sheath the sleeve 17 retracts to the left, as viewed in FIG. 2, from the conduit by reason of the different pitch of the threads 20 and 26 and the collar 13 is advanced by turning it until the end face of the conduit 11 abuts the inside face of end wall 23. The body member 12 is then turned to advance the sleeve 17 for its full length into the conduit 11 and to bring the nut section 19 into abutment with the collar end wall 23, the projections 21 serving to lock the collar against release rotation. In the above position the end section of conduit 11 is wedged and compressed between the confronting faces of the collar 13 and sleeve 17 to form a liquid and vapor tight connection to the conduit.

While there has been described and illustrated a preferred embodiment of the present invention, it is apparent that numerous alterations, omissions and additions may be made without departing from the spirit thereof.

What is claimed is:

1. A fitting for helically wound flexible conduit having a yieldable sheath comprising a sleeve having a helical ridge on its outer face of a pitch corresponding to that of said helically wound conduit and a collar coaxial with said sleeve and having an internal thread adapted to engage said sheath and an inner annular end wall provided with a helical groove engaging said sleeve helical ridge.

2. The fitting of claim 1 wherein the pitch of said collar internal thread is less than that of said helical ridge.

3. The fitting of claim 2 wherein the threaded inside face of said collar is axially tapered.

4. The fitting of claim 3 wherein said sleeve is longer than said collar.

5. The fitting of claim 1 comprising an externally threaded tubular coupling section integrally formed and coaxial with said sleeve.

6. The fitting of claim 5 comprising a tool accommodating section integrally formed and coaxial with and disposed between said sleeve and coupling section.

7. In combination with a helically wound flexible conduit having a yieldable sheath and a helical groove along its inside face, a fitting having a helical ridge on its outer face of a pitch corresponding to that of said helical groove and a collar coaxial with said sleeve and having an internal thread and an inner annular end wall provided with a helical groove engaging said sleeve helical ridge, an end of said conduit being sandwiched between and compressed by the confrontery faces of said collar and said sleeve, said sheath being engaged by said collar internally threaded face and said sleeve helical ridge engaging the helical groove disposed along the inside face of said conduit.

8. The combination of claim 7 wherein the pitch of said collar internal thread is less than that of said helical ridge.

9. The combination of claim 8 wherein the threaded inside face of said collar is axially tapered toward said end of said conduit.

10. The combination of claim 7 wherein the end face of said conduit abuts the confronting end face of said collar annular wall.

* * * * *